United States Patent [19]

Caplin et al.

[11] 4,295,817

[45] Oct. 20, 1981

[54] METHOD AND MEANS FOR CONTROLLING THE OPERATION OF FLUIDIZED BED COMBUSTION APPARATUS

[75] Inventors: Peter B. Caplin, Sunbury-on-Thames; Maurice Harman, Milton Keynes, both of England

[73] Assignee: The Energy Equipment Co. Ltd., Olney, England

[21] Appl. No.: 62,340

[22] Filed: Jul. 31, 1979

[30] Foreign Application Priority Data

Aug. 4, 1978 [GB] United Kingdom ............... 32214/78
Dec. 11, 1978 [GB] United Kingdom ............... 48028/78

[51] Int. Cl.³ ............................................. F23D 19/02
[52] U.S. Cl. ........................................ 431/7; 432/15; 422/139
[58] Field of Search ................. 431/5, 7, 170, 75, 115, 431/116; 122/4 D; 165/104 F; 432/15, 58; 422/139-142; 34/57 R, 57 A; 110/245; 126/79; 138/37; 366/336, 337

[56] References Cited

U.S. PATENT DOCUMENTS 1,896,910 3/1932 Merkt .................................. 431/115
2,258,515 8/1939 Mowat .................................. 431/75
2,763,478 8/1949 Parry .................................... 432/15

*Primary Examiner*—Sheldon J. Richter
*Assistant Examiner*—Robert J. Marett

[57] ABSTRACT

The specification describes a method and means for controlling operation of a fluidized bed combustion apparatus. In the proposals embodied in the invention the supply of combustion air fed to the fluidized bed is augmented by inert gas (preferably waste gas taken from a low temperature outlet of the apparatus) and the proportion of inert gas used to augment the combustion supporting air is variable in dependence upon the temperature of the fluidized bed in the apparatus and/or the thermal demand placed upon the apparatus. In described embodiments of means enabling the invention to be effected arrangements are described including an induced draft fan, coupled to the outlet for waste gas of the apparatus, for feeding waste gas to a mixer and the use of a two input mixer fan coupled to both atmosphere and a waste gas supply line connected to a waste gas outlet. The volume of waste gas supplied is controllable in dependence upon the temperature of the bed in the apparatus and/or the thermal demand placed on the apparatus. The rate at which fuel is fed to the apparatus may also be controlled in dependence upon the thermal demand placed on the apparatus.

21 Claims, 4 Drawing Figures

METHOD AND MEANS FOR CONTROLLING THE OPERATION OF FLUIDIZED BED COMBUSTION APPARATUS

The present invention concerns method and means for controlling the operation of fluidised bed combustion apparatus.

When burning fuels in fluidised bed combustion apparatus, fuel supplied to the apparatus is supported by the fluidised bed material. Combustion of the fuels supplied to the bed takes place in the bed (primary-phase combustion) and the combustion of gases and fine solid particles released in the primary-phase combustion continues above the bed (secondary-phase combustion).

Various fuels, either alone or admixed with one another may be used to fuel a fluidised bed combustion apparatus; for example coal, lignite, peat, wood, liquid hydrocarbons, tar and organic wastes may be used singly or when mixed with one another.

To optimise operation of a fluidised bed combustion apparatus certain factors need to be controlled.

One of these is the temperature of the bed material (the primary-phase combustion temperature), another is the temperature of combustion of partly burnt gaseous and fine solid products passing from the bed to the space above the bed (the secondary-phase combustion temperature). Other factors include the degree of fluidisation of the bed material, and the volume of gas (usually air) passed to the apparatus to support combustion in the apparatus. Control of these factors must be effected to enable efficient operation of a fluidised bed combustion apparatus which in the course of its operation has to meet a variable thermal loading.

A known method of cooling a fluidised bed rapidly is to inject water or steam into the bed material which leads to an endothermic water-gas reaction resulting in the bed rapidly being cooled. Such a control method whilst allowing rapid bed cooling, does not enable the temperature of a fluidised bed to be readily controlled at a substantially constant temperature as is desired for optimum operation of the apparatus.

The temperature in the secondary-phase combustion zone (above the fluidised bed) should be as high as possible (to enable a high degree of radiative heat transfer to the walls of the apparatus) but at the same time should not be so high as to lead to the formation of dangerous chemical compounds (or so high as to cause structural damage to the apparatus).

The flow rate of fluidising gas to the bed material should be readily accurately controllable to ensure satisfactory fluidisation of the bed material. If the flow rate of fluidising gas is too low the material of the bed will not be adequately fluidised so that fuel fed to the bed will neither be distributed within, nor be mixed properly with, the bed material. If the fluidising gas flow rate is too high the power requirements for the fans and/or pumps passing that gas to the bed is needlessly increased, and the bed material may, in extreme cases, be thrown out of the bed and lost.

In the designs of fluidised bed combustion apparatus we have produced to date we have found it convenient to use the combustion gas passed to the fluidised bed to fluidise the bed material. We have adopted an arrangement in which the supply of combustion gas (usually air) to the bed material is made via one or more sets of sparge pipes extending horizontally through the bed material.

We have found with such arrangements that the provision of the correct fluidising gas flow rate (the flow rate of fluidising gas necessary to support proper fluidisation of the bed material) may be higher than that required to optimise the combustion gas flow rate (the air flow-rate necessary to support combustion of fuel fed to the apparatus). That is to say in certain cases the supply of combustion air to a fluidised bed at a rate sufficient to enable proper fluidisation of the bed material may lead to too high primary and secondary phase combustion temperatures.

According to one aspect of the present invention there is provided a method of operating a fluidised bed combustion apparatus wherein the total volume of gas fed to the apparatus to cause fluidisation of the bed material and to support combustion of fuels fed to the apparatus includes a proportion of inert gas, and wherein the proportion of inert gas may be varied.

Within this specification and the claims appended hereto the term 'inert gas' encompasses gases which do not support combustion.

With advantage the method includes the step of using waste gas taken from an outlet of the combustion apparatus; preferably a low temperature outlet thereof.

As combustion in a fluidised bed combustion apparatus is near stoichiometric waste gases are effectively inert and will not support combustion. The waste gases added to the combustion gas flow to the apparatus effectively dilute the oxygen in that gas flow within the fluid bed.

Preferably we arrange that the waste gases are mixed with the combustion air fed to the fluidised bed prior to the injection of that air in the bed to promote sub-stoichiometric in bed combustion. The proportion of waste gas mixed with the combustion air is controlled relative to the bed temperature and acts as a variable heat carrier transferring heat from the primary-phase combustion (in the bed) to the secondary-phase combustion (above the bed). The proportion of waste gas mixed with the supply of combustion air may be controlled as a function of the bed temperature or as a function of the required thermal output from the apparatus.

According to a further feature of the invention we provide a method of operating a fluidised bed combustion apparatus including the steps of controlling the flow of gas supplied to the bed to enable fluidisation of the bed and combustion of fuel fed to the bed by mixing therewith a proportion of inert gas, the proportion of inert gas being variable whilst at the same time controlling the rate at which fuel is supplied to the bed in dependence upon the thermal demands placed upon the apparatus.

To enable the method of the invention to be carried out a further aspect of the present invention provides a fluidised bed combustion apparatus including means enabling the supply of gas fed to the apparatus to cause fluidisation of the bed material and to support combustion of fuels fed to the apparatus to be augmented by inert gas, said means enabling the proportion of inert gas used to augment the supply of fluidising gas to be varied.

Preferably the apparatus comprises means for extracting waste gas passing from an outlet of the combustion apparatus and applying this to the supply of fluidising gas fed into the apparatus. The waste gas is preferably extracted from a low temperature outlet of the combustion apparatus as the lowest temperature gas supply is most suitable for cooling the bed.

Although the waste gas may be directly injected into the bed we preferably arrange that the waste gases are mixed with the air fed to the fluidised bed combustion apparatus prior to injection of the fluidising air in the bed so as to reduce the temperature of in-bed combustion.

The rate at which waste gas is mixed with the combustion air passed to the combustion apparatus is advantageously controlled by means included in the apparatus responsive to the bed temperature.

Yet another aspect of this present invention provides a fluidised bed combustion apparatus including means for mixing with the flow of gas supplied to the bed to enable fluidisation of the bed and to support combustion of fuel fed to the bed a proportion of inert gas, the proportion of inert gas mixed with the flow of fluidising gas being variable, and means for controlling the rate at which fuel is supplied to the bed in dependence upon thermal demand placed upon the apparatus. Said means controlling the fuel feed rate may with advantage also be arranged to control the combustion gas flow rate to the apparatus.

The apparatus of the present invention enables a variable heat demand from the apparatus to be met, and for the supply of fuel and of combustion air to the apparatus to be controlled to provide optimum operating conditions enabling the apparatus to operate at a steady bed temperature with a constant degree of bed material fluidisation.

The method and apparatus embodying this invention will now be described with reference to the accompanying drawings in which.

Figure 1:
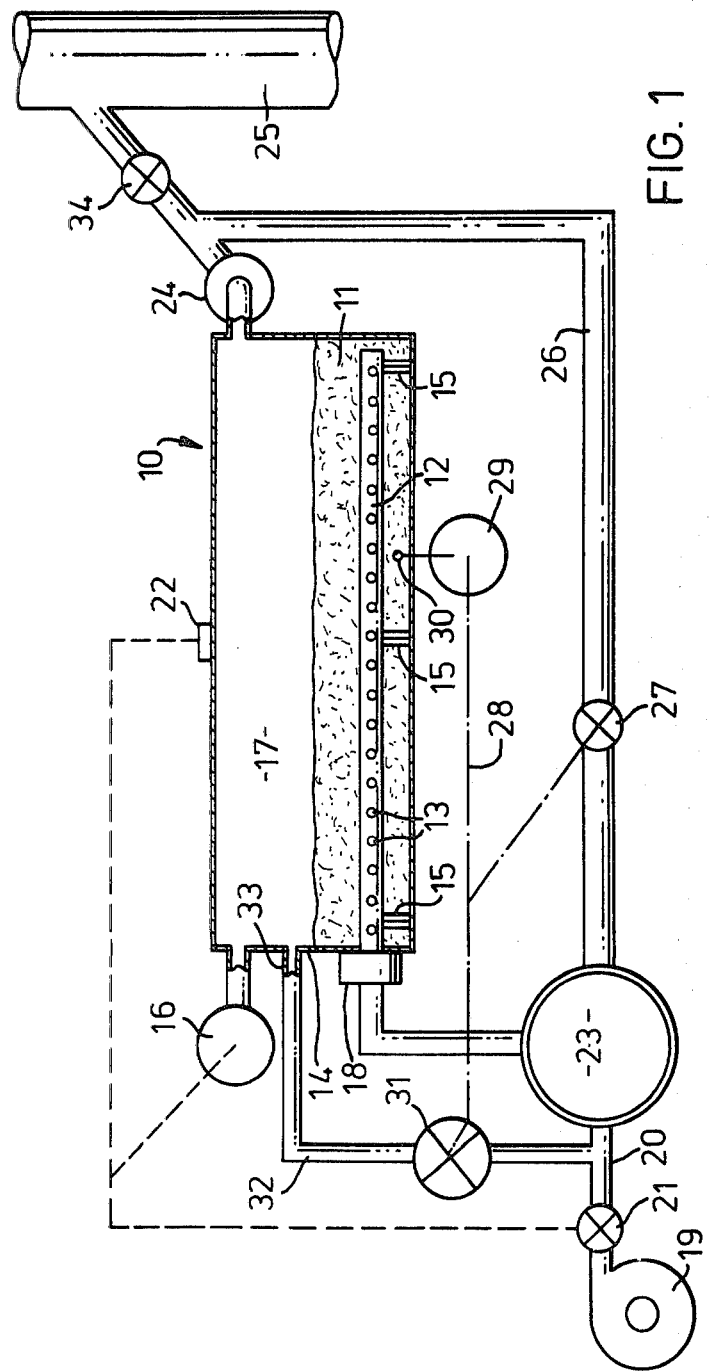
FIG. 1 is a diagrammatic view of fluidised bed combustion apparatus embodying the invention.

The fluidised bed combustion apparatus of FIG. 1 includes a fluidised bed combustion chamber 10 housing a fluidised bed 11 fed with fluidising gas via an array of sparge tubes 12 extending horizontally through the bed material as shown. The sparge tubes 12 may be arranged on one level within the bed material (as shown) or may be arranged at a number of different depths within the bed. The tubes 12 are provided with apertures 13 extending substantially horizontally away from the axis of each tube 12. The sparge tubes may extend freely from an end plate 14 of the apparatus or be supported on a plurality of supports 15 as shown.

Fuel is fed to chamber 10 by a feeder 16 and combustion of the fuel fed thereto takes place both in the bed (where the fuel is supported by the bed material) and in the volume 17 above the bed (to which volume the gaseous and fine solid products of in-bed combustion are carried).

Heat transfer from the apparatus may be via the walls of chamber 10 (which can be surrounded by a water jacket—not shown) or via water tubes submerged in the bed (not shown) in dependence upon the particular design of combustion apparatus envisaged.

Air for fluidising the bed and supporting combustion of fuels fed to the bed is passed to the array of sparge tubes from a primary gas inlet in the form of a plenum chamber 18. Chamber 18 is supplied with air from a blower 19 via a gas feed line 20. Line 20 includes a restrictor valve 21 which is operable to control the rate of flow of air to the plenum chamber 18.

The condition of restrictor valve 21 is controlled in accordance with the demand from the combustion apparatus as measured by a means shown schematically at 22.

The means 22 may be arranged to measure the thermal demand placed on the apparatus by measuring the rate of steam flow from the apparatus (or from the water temperature in the case of a hot water boiler). Preferably we arrange that the means 22 measures the pressure of steam produced by the combustion apparatus which, it will be appreciated, varies in dependence upon the demand put on the apparatus. The means 22 is also arranged to control the work rate of the fuel feeder 16 and therefore the rate at which fuel is fed to the combustion chamber 10.

The means 22 may be arranged to provide electrical signals controlling a servo mechanism having cams coupled both the restrictor valve 21 and the fuel feed device 16. Alternatively the means 22 may generate signals directly controlling the feeder 16 and valve 21.

The combustion air passing to the plenum chamber 18 may be pre-heated in a heater (not shown) through which the line 20 passes. This pre-heating may be effected to raise the bed temperature to a working level when starting the apparatus from rest and to provide trim-heat enabling the temperature of the bed to be raised, should it be necessary, during operation of the apparatus. The pre-heater would normally be used only to raise the temperature of the bed at the start of operation and would then be turned off.

The flow of air to the plenum chamber 18 has inert gas mixed with it in a mixer 23. The inert gas mixed with the flow of combustion air may be taken from any suitable source but preferably comprises waste gas passing from the combustion apparatus and taken from the output of an induced draft fan 24 passing waste gas from the apparatus to a chimney 25. The waste gas carried from the fan 24 is passed to the mixer 23 via a gas line 26.

The proportion of inert gas mixed with the supply to chamber 18 is controlled by a restrictor valve 27 in line 26. The condition of valve 27 (and therefore the proportion of waste gas mixed with the flow of air) is controlled (via a linkage 28) by a motor 29 driven to move valve 27 to a position chosen in dependence upon the temperature of the fluidised bed 11. Control of motor 29 may be effected, for example, by a thermo-couple or other temperature sensing means 30 in the bed 11.

Control of the condition of valve 27 is arranged such that the valve opens to enable more waste gas to pass to the mixer valve 23 if the temperature of the bed rises (thereby effectively diluting the supply of combustion air to the fluidised bed with a tendency to reduce the bed temperature) and such that the restrictor valve 27 is closed somewhat (reducing the proportion of the waste gas mixed with the air in the mixer 23) if the temperature of the bed 11 falls.

Linkage 28 also controls a restrictor valve 31 in a line 32 coupling line 20 (at a point between restrictor valve 21 and mixer valve 23) to a secondary air inlet 33 opening into the volume 17. Valve 31 is operable to control the supply of air to the volume 17 above the fluidised bed in the apparatus.

The air supplied via line 32 to the volume 17 above bed 11 supports combustion of gases and fine solid particles carried up from the bed by primary-phase combustion taking place in the bed, and is controlled in dependence upon the in-bed temperature as a proportion of the total volume of air supply to the apparatus. Valve 27 is arranged such that should the bed temperature rise (so that the proportion of flue gas mixed with the air passing to the chamber 18 is increased) the air to the volume 17 is also increased. On the other hand if the bed temperature falls the flow of air to the inlet 33 is reduced and the volume of air passing to the primary air inlet plenum chamber 18 is increased (together with a reduction in the volume of flue gas passing to the chamber 18 due to action by the valve 27).

In this way the proportion of air passed to the apparatus via the inlets 18 and 33 may be controlled without affecting the total volume of air passed to the apparatus.

It will be seen that this apparatus enables the control of the fuel supply and of the air supply to the combustion apparatus in dependence upon the demands made of the apparatus, and further enables control of the proportion of inert gas mixed with air passing to the fluidised bed, and of air passing to the volume above the fluidised bed, in dependence upon the temperature of the fluidised bed.

A valve 34 is provided in the link between the fan 24 and chimney 25 as shown to control the total volume of waste gas passing to chimney 25.

Figure 2:
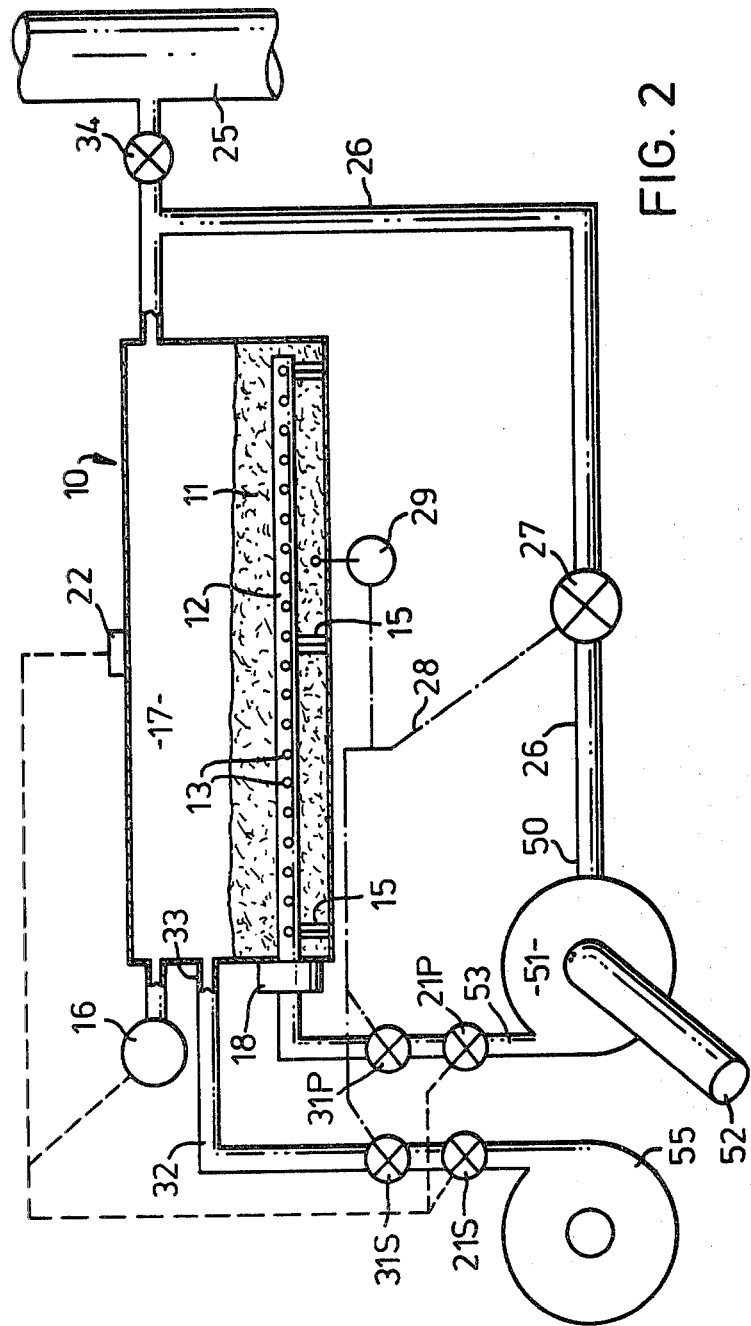
FIG. 2 is a diagrammatic view of a modified form of the combustion apparatus of FIG. 1.

FIG. 2 shows a modified form of the apparatus shown in FIG. 1, parts of the modified arrangement of FIG. 2 which correspond with those of the apparatus of FIG. 1 are given the same reference numerals.

As will be apparent from FIG. 2 the mixer valve 23 for air and flue gas of the arrangement of FIG. 1 has been removed and the gas line 26 feeds flue gas directly to one inlet 50 of a two inlet fan 51, the other inlet of which is arranged to collect air. Air and gas are mixed in the fan 51 and pass from its outlet 53 to a restrictor valve 21P, the resultant mixture of air and gas passes to the bed 11 via the chamber 18 and sparge tubes 12 as before. In distinction to the arrangement of FIG. 1 air to the volume 17 in the arrangement of FIG. 2 is supplied via line 32 from a fan 55 separate from the main, primary-phase combustion air supplied to the bed 11 from fan 51.

With the arrangement of FIG. 2 the need for an induced draft fan (necessary in the arrangement of FIG. 1 to ensure that the pressure of gas supplied to the mixer 23 corresponds to the pressure of gas from the fan is obviated, and therefore, no induced draft fan need be provided at the waste gas outlet.

The arrangement of FIG. 2 enables waste gas to be added to the combustion air at the point at which that combustion air is entrained for supply to the fluidised bed in apparatus.

The effects of this modification are firstly that there is no need for all induced draft fan 24 such as is provided to collect the waste gases passing from the arrangement of FIG. 1, secondly the arrangement of FIG. 2 enables control of the volume of waste gas supplied to the apparatus to be controlled in dependence upon firstly the bed temperature (control being effected by the restrictor valve 27 of the supply of waste gas to the fan 51) and by the means 22 (in dependence upon the thermal demand placed upon the apparatus).

The valves in the ducts 32 and 53 are arranged in pairs, such that valves 21S and 21P control the total air-volume in response to the control signals from element 22 (and in accord with the fuel supply means 16) by opening and closing together. The two valves 31S and 31P, are controlled by temperature dependent element 29 and work from a common linkage 28 which also controls recycled waste gas flow through valve 27, to operate in opposite directions, so that one opens as the other one closes. In this way, they alter the ratio of air fed to the apparatus to support primary-phase and secondary-phase combustion without affecting the total air flow to the apparatus and to allow the primary-phase combustion supporting air volume to be varied in response to bed-temperature.

It is possible to achieve a similar control of output and temperature of the fluidised bed unit by manipulating the control-signals electrically and to feed the pressure signal to the fuel control, the temperature signal to the primary air and recycled waste gas control and the difference to the secondary ash control, thereby achieving the same object with fewer mechanical valves, but requiring a more complex electrical system.

Figure 3:
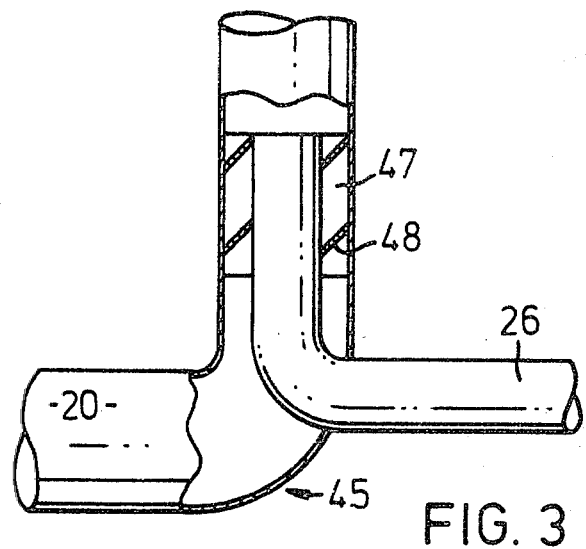
FIG. 3 illustrates, to an enlarged scale, part of the arrangement of FIG. 1.

FIG. 3 shows in detail part of the mixer valve 23 of the arrangement of FIG. 1.

As can be seen the air line 20 carrying combustion air turns through an elbow 45 which the line 26, carrying recycled waste gas, also joins. Line 26 passes up the axis of the mixer valve 23 and leads to the primary air plenum chamber 18 (as shown in FIG. 1). The volume 47 surrounding the line 26 and within the line 20 encloses a plurality of vanes 48 which have the effect of causing the air passing from the line 19 to swirl. The swirling air passing the end of the line 26 causes the air to entrain and thoroughly mix with recycled waste gas issuing from the end of line 26.

Figure 4:
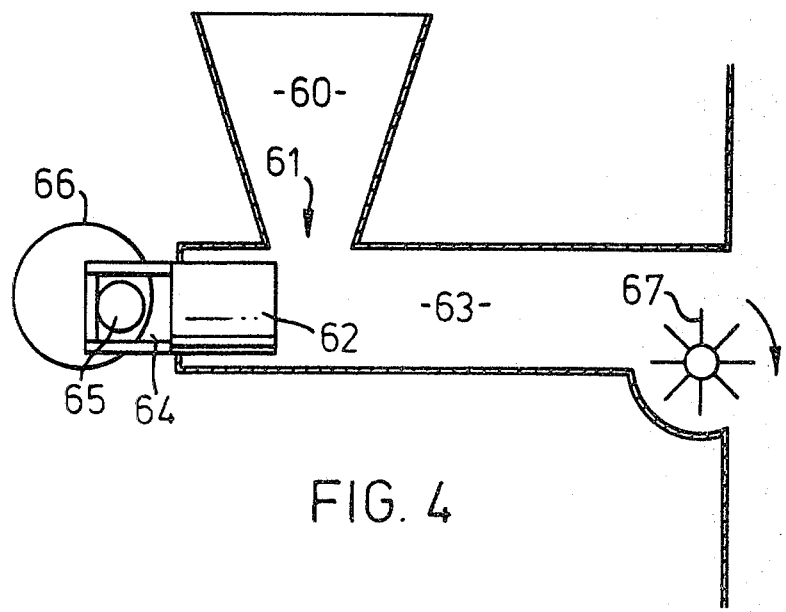
FIG. 4 illustrates, to an enlarged scale, parts of the arrangement of FIGS. 1 and 2.

FIG. 4 diagrammatically shows in detail a fuel feeders 16 of the arrangements of FIG. 1 and 2. In particular this figure shows a coal feeder which includes a hopper 60 in which coal is loaded and which opens at its bottom 61. A piston 62 is arranged to shunt coal falling from the hopper 60 along a channel 63. Piston 62 is coupled to a Scotch Yoke 64 driven by an eccentric cam 65 on the output of a controllable magnetic clutch (not shown) in turn driven by a constant velocity motor 66. The magnetic clutch (which is preferably of the Pye TASC type) may be controlled to vary the rate at which the eccentric cam rotates and therefore the rate at which the piston reciprocates. Control of the clutch therefore enables the rate at which fuel is fed along the channel 63 to be controlled.

Channel 63 ends at the wall 14 of the apparatus and includes a paddle wheel 67 driven to rotate at constant speed. Particles of fuel falling on the paddle wheel are thrown on to the fluidised bed. Particles falling to the centre of the paddle wheel are not given as much kinetic energy particles meeting the edge of the paddel wheel and are therefore not thrown as far. This enables an even distribution of fuel to be made across the surface of the bed.

Other fuel may be fed to the combustion apparatus if such other fuels include fluid fuels, for example liquid hydrocarbons the fuel feed device may include a variable speed pump.

Other fuel feed devices may be used in accordance with this invention providing they are controllable to vary the rate of fuel supplied to the apparatus such that the temperature of the apparatus may be maintained constant in the face of varying heat demands put thereupon.

It will be appreciated that the present invention provides a method and apparatus enabling the ready control of a fluidised bed combustion apparatus in which the primary air flow to the bed is controlled by a servo mechanism the position of which servo mechanism may also be used to control the volume of waste gas mixed with the combustion air. It is further suggested in the present application that a proper balance of waste gas and air for any given operating condition may be achieved by the use of characteristic cams driven by a servo mechanism to control dampers of valves determining both the supply of combustion air to the bed and also the amount of waste gas mixed therewith.

Such an operating method ensures both that a constant fluidisation volume gas is provided to the bed and that the bed may operate at a constant temperature.

By limiting combustion air in this way the size of the bed for a given output may also be reduced to a minimum.

It will be appreciated that the particular arrangements that have been described enable the complex pattern of requirements necessary to achieve optimum operation of a fluidised bed combustion apparatus to be controlled; in particular the arrangement enables the degree of partial combustion of fuel fed to the apparatus, in the bed itself, to be related to the bed temperature. It enables the supply of combustion air to the bed to be reduced if the bed temperature rises (by enabling the proportion of waste inert gas added to the combustion air to be increased) and viceversa.

The described apparatus enables the supply of air to the volume above the bed which, providing the temperature of the bed itself is sufficiently high to break down fuels supplied to it, will support combustion of partially burnt solids passing up from the bed, or gases or vapours passing therefrom.

The apparatus enables the flow of combustion air to the apparatus to be increased if the thermal loading of the apparatus increases or vice-versa.

When operating the method of the present invention the temperature above the fluid bed should be high enough to enable effective radiative heat transfer however it may be desirable not only to reduce the temperature above the bed by use of recycled waste gas induction into the secondary combustion air supplied to the volume above the bed. Such an arrangement will also ensure high mass flow rate for effective heat transfer in the low temperature region is obtained. The volume of waste gas will thus increase with rising demand and fuel-supply, against a constant flow from the bed so that linking the waste gas to the secondary air flow for example by means of valves controlled by the servo mechanism controlling the primary combustion flow, in dependence upon the thermal demand upon the apparatus. Thus a demand asked of the apparatus gives rise to an increased air flow and reduced flame temperature).

An alternative arrangement could provide that the proportion of waste gas supplied to the space above the bed is controlled directly from measurement of the flame temperature but, as in the case of waste gas control to the bed the described arrangement is thought to be simpler.

The pressure of combustion air supplied to a fluidised bed is fairly high (of the order of 80 cm of water) and to induce waste gas to the combustion air stream, it may be possible to pass the waste gas through the eye of the combustion air fan or, as noted above, by means of a venturi arrangement. The use of a venturi arrangement or jet pump will be necessary when operating combustion apparatus without an induced draught fan.

Even if an induced draft fan is used this may quite often be such a distance from the boiler that the waste gas may be more conveniently taken near the control damper in the flue leading from the boiler directly to a venturi arrangement adjacent the boiler input. It is possible to induce waste gases at a point beyond the fluid bed (i.e. above the bed) merely to increase the mass flow in the case of boilers designed massive excess air volumes when mass flow rate needed, exceeds that need for effective fluid bed temperature control and a flame temperature limitation.

We claim:

1. A fluidised bed combustion apparatus comprising means for supplying fuel to said fluidized bed, means for injecting combustion air into the fluidised bed of the apparatus to cause fluidisation of the bed material and to support combustion of fuel fed to the bed, means for measuring at least one of the temperature of the bed and the thermal demand placed upon the apparatus, means for augmenting said supply of combustion air, prior to its injection into the fluidised bed with waste gas drawn from a waste gas outlet of the apparatus, said augmenting means being operable to enable the volume of waste gas mixed with the combustion air to be varied in dependence upon at least one of the temperature of the fluidised bed and the thermal demand placed on the apparatus.

2. Apparatus according to claim 1 wherein said augmenting means includes extractor means operable to extract waste gas passing from an outlet of the apparatus and to supply this waste gas to the supply of combustion air fed to the fluidised bed in the apparatus.

3. Apparatus according to claim 2, including control means operable to control operation of said fuel supply means and thereby the rate at which fuel is supplied the bed in dependence upon the thermal demand placed upon the apparatus.

4. Apparatus according to claim 3, including air supply means operable to supply air to the volume of the apparatus above the fluidised bed therein to support secondary-phase combustion of gases and fine solids evolved from the bed.

5. Apparatus according to claim 4, wherein said waste gas extractor means comprises an induced draft fan connected to a waste gas outlet of the apparatus and arranged to supply waste gas to a mixer, via a waste gas supply line, in which said waste gas is mixed with combustion air supplied to the fluidised bed.

6. Apparatus according to claim 5, in which the waste gas supply line includes a valve and a servomechanism operable to control said valve to control the volume of waste gas passing therealong in dependence upon the temperature of the fluidised bed.

7. Apparatus according to claim 5, the mixer comprising two concentric sleeves of differing diameter wherein the inner sleeve is shorter than the outer, the volume between said inner and said outer sleeves including vanes and being coupled to receive combustion air, and the inner sleeve being coupled to receive waste gas, such that air supplied to the mixer under pressure is caused by the vanes to swirl and as it passes the end of the inner sleeve, to entrain and mix with said waste gas.

8. Apparatus according to claim 4, wherein said waste gas extractor means comprises a two input fan, a first input of which is coupled to a waste gas supply line connected to a waste gas outlet of the apparatus and the second input of which receives air.

9. Apparatus according to claim 8, in which the waste gas supply line includes a valve, and a servomechanism operable to control said valve to control the volume of waste gas passing therealong in dependence upon the temperature of the fluidised bed.

10. Apparatus according to claim 9, wherein said servomechanism is arranged further to control operation of a valve to effect control of the volume of air fed to the volume of the apparatus above the fluidised bed.

11. Apparatus according to claim 10, including a second servomechanism operable to control the rate at which fuel is supplied to the apparatus in dependence upon the thermal demand placed upon the apparatus, said fuel controlling servomechanism being arranged to control the total volume of combustion air fed to the fluidised bed.

12. Apparatus according to claim 11, further including a pre-heater operable to heat gas fed to the fluidised bed.

13. A fluidised bed combustion apparatus comprising means for supplying fuel to said fluidized bed, means for injecting combustion air into the fluidised bed of the apparatus to cause fluidisation of the bed material and to support combustion of fuel fed to the bed, and means for measuring at least one of the temperature of the bed and the thermal demand placed on the apparatus, and means supplying combustion air to the apparatus above the fluidised bed to support secondary-phase combustion of gases and fine solids evolved from the bed.

14. Apparatus according to claim 13, wherein including waste gas extractor means comprising an induced draft fan connected to a waste gas outlet of the apparatus and arranged to supply waste gas to a mixer, via a waste gas supply line, in which said waste gas is mixed with combustion air supplied to the fluidised bed, said mixer comprising two concentric sleeves of differing diameter, the inner sleeve being shorter than the outer, the volume between the inner and outer sleeves being formed with vanes and being coupled to receive combustion air, and the inner sleeve is coupled to receive said waste gas, such that air supplied to the mixer is caused by the vanes to swirl and as it passes the end of the inner sleeve, to entrain and mix with the waste gas.

15. Apparatus according to claim 14, said waste gas supply line including a valve operable, by a servomechanism, to control the volume of waste gas passing therealong in dependence upon the temperature of the fluidised bed, said servomechanism further controlling operation of a valve to effect control of the volume of air fed to the volume of the apparatus above the fluidised bed.

16. Apparatus according to claim 13, including waste gas extractor means comprising a two input fan, one input of which is coupled to a waste gas supply line connected to a waste gas outlet of the apparatus and the other input of which receives air.

17. Apparatus according to claim 16, said waste gas supply line including a valve operable, by a servomechanism, to control the volume of waste gas passing therealong in dependence upon the temperature of the fluidised bed, said servomechanism further controlling operation of a valve to effect control of the volume of air fed to the volume of the apparatus above the fluidised bed.

18. A method of operating a fluidized bed combustion apparatus comprising the steps of feed fuel and air separately to support combustion in the fluidized bed, mixing with said air prior to feeding to said fluidized bed waste gas taken from the outlet of the apparatus and varying the volume of waste gas mixed with the air in dependence upon at least one of the temperature of the fluidized bed and the thermal demand placed on the apparatus.

19. The method of claim 18 including the step of feeding combustion air directly to the apparatus above the fluidised bed to support secondary-phase combustion of gases and solids evolved from the bed.

20. The method of claim 19, including the additional step of controlling the rate at which fuel is fed to the combustion apparatus in dependence upon the thermal demand placed upon the apparatus.

21. The method of claim 18, including the additional step of controlling the rate at which fuel is fed to the combustion apparatus in dependence upon the thermal demand placed upon the apparatus.

* * * * *

UNITED STATES PATENT AND TRADEMARK OFFICE
CERTIFICATE OF CORRECTION

PATENT NO. : 4,295,817
DATED : October 20, 1981
INVENTOR(S) : Peter B. CAPLIN et al It is certified that error appears in the above-identified patent and that said Letters Patent are hereby corrected as shown below:

Claim 13 should read as follows:

13. A fluidised bed combustion apparatus comprising means for supplying fuel to said fluidised bed, means for injecting combustion air into the fluidised bed of the apparatus to cause fluidisation of the bed material and to support combustion of fuel fed to the bed, and means for measuring at least one of the temperature of the bed and the thermal demand placed on the apparatus, means for augumenting said supply of combustion air, prior to its injection into the fluidised bed by waste gas drawn from a waste gas outlet of the apparatus, said augmenting means being operable to enable the volume of waste gas mixed with the combustion air to be varied in dependence upon at least one of the temperature of the fluidised bed and the thermal demand placed on the apparatus, and means supplying combustion air to the apparatus above the fluidised bed to support secondary-phase combustion of gases and fine solids evolved from the bed.

Signed and Sealed this

Eleventh Day of February 1986

[SEAL]

Attest:

DONALD J. QUIGG

Attesting Officer

Commissioner of Patents and Trademarks